United States Patent [19]
Suzuki

[11] 3,737,085

[45] June 5, 1973

[54] AUTOMATIC SHUTOFF SYSTEM FOR MAGNETIC TAPE REPRODUCERS AND RECORDERS

[76] Inventor: Nobuo Suzuki, No. 26-9, Yokoyama 3-chome, Sagamihara, Japan

[22] Filed: Apr. 26, 1972

[21] Appl. No.: 247,754

[30] Foreign Application Priority Data

Aug. 21, 1971 Japan ................................46/63882

[52] U.S. Cl. ........................226/11, 242/186, 226/25

[51] Int. Cl. ............................................B65h 25/00

[58] Field of Search..........................226/11, 43, 179, 226/25; 242/186, 57; 274/4 C, 4 D

[56] References Cited

UNITED STATES PATENTS 3,608,845 9/1971 Kozu ....................................242/186

3,620,429 11/1971 Kozu ....................................226/11

*Primary Examiner*—Allen N. Knowles

*Attorney*—Hill, Sherman, Meroni, Gross & Simpson and Harry Mansen

[57] ABSTRACT

A magnetic tape reproducer and recorder with an automatic switch-off system, including a pivotally mounted roller assembly comprising a pressure roller which is axially aligned with a guide roller adapted to be rotatable independently of the pressure roller and effecting the giving of a signal which causes the starting button of the tape device to return to its inoperative starting position when the tape has run off.

4 Claims, 2 Drawing Figures

AUTOMATIC SHUTOFF SYSTEM FOR MAGNETIC TAPE REPRODUCERS AND RECORDERS

BACKGROUND OF THE INVENTION

Figure 1:
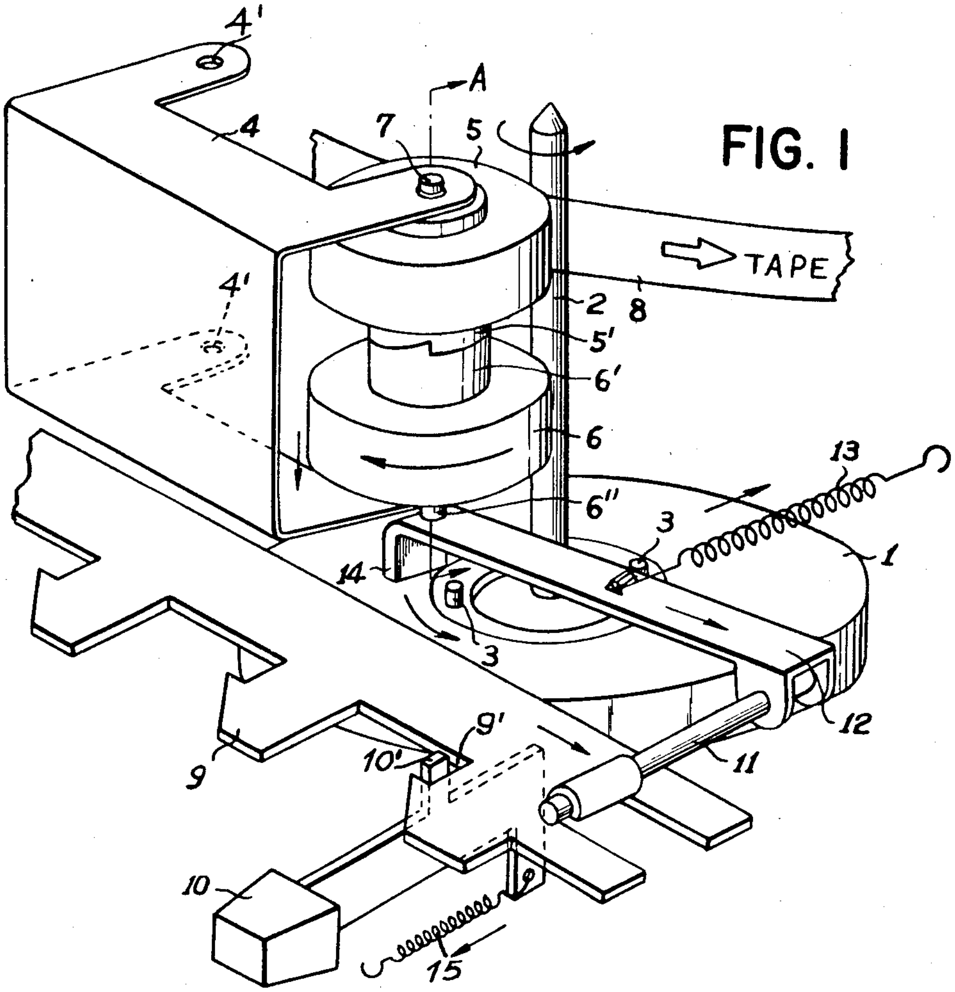

The present invention relates to a magnetic tape reproducer or recorder, and more particularly to a compact magnetic tape reproducer or recorder which produces a signal to cause an automatic switch-off of the magnetic tape reproducer or recorder when the magnetic tape has run off.

There have already been designed various types of systems for automatically switching off magnetic tape reproducers or recorders when the tape has run off from the take-off reel. These known automatic switch-off systems are complicated in structure and require a considerably advanced and well trained technique. Two kinds of automatic switch-off systems are available which either operate electrically or mechanically. In the electrical system a special signal tape is provided on a part of the magnetic tape's end which is capable to sense a signal by photoelectrically or magnetically or by electric contact when the magnetic tape has run off. This system is effective and reliable, however, requires a complicated structure and is very expensive.

In a known mechanical system a signal is sensed by transition of the magnetic tape tension at the end of the tape. However, this type of system is liable to produce scratches on the surface of the tape.

SUMMARY OF THE INVENTION

It is an object of the present invention to provide a compact magnetic tape reproducer or recorder, especially for magnetic tape of "Cassette" type, with a novel automatic switch-off system, which is capable of giving a signal which mechanically turns off the tape device when the tape has run off, and which can be operated easily and reliably.

Another object of the present invention is to provide a magnetic tape reproducer or recorder having an improved automatic switch-off system, which is simple in structure and can be manufactured at low cost.

Still another object of the present invention is to provide an improved automatic switch-off system which requires no additional signal tape or material on the magnetic tape.

A still further object of the present invention is to provide an improved automatic switch-off system which can be operated without fear of producing scratches on the magnetic tape.

These and other objects as well as the features and advantages of the present invention will become apparent by reading the following detailed description in conjunction with the accompanying drawing.

IN THE DRAWINGS

Figure 2:
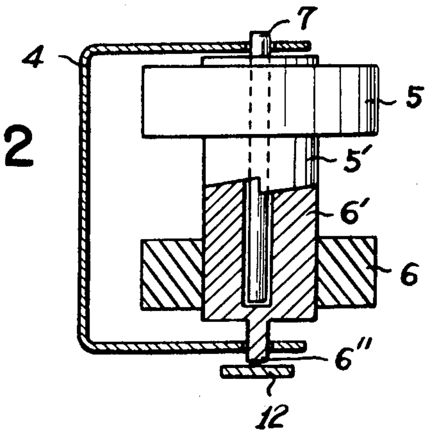

FIG. 1 is a perspective view of a mechanism of the automatic switch-off system embodying the present invention, and FIG. 2 is a vertical sectional view, on an enlarged scale, of the pressure and guide roller assembly, taken along the line A—A of FIG. 1.

Referring to the drawings, the reference numeral 1 represents a flywheel of a magnetic tape reproducer or recorder of the present invention. This flywheel 1 is attached to a vertical motor driven shaft 2 and has on its upwardly directed face at least one upwardly projecting pin 3.

A roller assembly is moved towards the shaft 2 during the reproducing or recording operation of the magnetic tape and comprises a bracket 4 which is U-shaped in cross section and has at one end mounted therein two axially spaced rollers 5 and 6 rotatable about a common vertical axis. The bracket 4 is pivotally mounted with its other end about a vertical pin passing through vertically aligned bearing holes 4' and is yieldably urged toward the vertical shaft 1 so that the rollers 5 and 6 come in engagement with said tape and said shaft 1, respectively, during the operation of the tape device. The roller 5 comprises a pressure roller and the other is a guide roller 6, both of which have the same diameter and are rotatably supported in one end of said U-shaped bracket 4 between the two flanges of the same.

Referring now to FIG. 2, the pressure roller 5 and the guide roller 6 are supported by a shaft 7 whose upper end is attached to the upper flange of the bracket 4 while the lower end extends into a center bore of the guide roller 6. Said pressure roller 5 and the guide roller 6 are arranged in axial alignment. The lower end face of the roller 6 has a shaft extension 6'' which is rotatably supported in the lower flange of the bracket 4 and the entire roller 6 is adapted to be moved axially downwardly.

Both rollers 5 and 6 are provided on their faces opposing each other with hubs 5' and 6' each provided with saw-tooth-like cams which mesh with each other under normal operating conditions of the tape movement. However, when one roller rotates with a different speed than the other, then the toothed hubs 5' and 6' of the same rotate relatively to each other and separate axially as will be described hereinafter.

A horizontal locking bar 9 is provided for holding the starting button 10 of the tape device after the button has been pushed inwardly so as to retain the starting button 10 at Play/Record position until the tape has run off.

The locking bar 9 is operatively connected by a transverse coupling rod 11 with one end of a cancel lever 12.

The said coupling rod 11 permits some play of the cancel lever 12. The other end of the cancel lever 12 is so positioned that it is engaged by the lower end of the shaft extension 6''. A tension spring 13 supports the cancel lever 12 in raised position. A tip 14 on the cancel lever 12 is bent downwardly and extends into the path of movement of the pin 3 on the flywheel 1.

The following description is directed to the manner in which the magnetic tape on the reproducer or recorder of the present invention is controlled by the device so far described.

In order to start the magnetic tape 8 on the reproducer or recorder to run, the starting button 10 is pushed manually inwardly by the operator. This causes the power switch to close and the motor driven shaft 2 to rotate. The starting button 10 has a lateral projection 10' which engages in this operative position a recess 9' provided in the locking bar 9, so that the magnetic tape 8 is kept to run continuously until it has run off or through the recorder or reproducer.

At the same time, the pressure roller 5 and the guide roller 6 are brought into engagement with the shaft 2, and the magnetic tape 8 is caused to run by being pressed by the clamping roller 5 against the shaft 2, while the guide roller 6 engages the shaft 2 directly and is driven by the latter at the same speed as the pressure roller 5 is driven.

As a result, the cam teeth on the pressure roller 5 and on the guide roller 6 are in mesh with each other.

When the magnetic tape has run off, the magnetic tape is caused to stop by the tape-end which is fixed to the tape reel, so that relatively, the pressure roller 5 is caused to stop its rotation even though the shaft 2 continues to rotate.

The guide roller 6, however, continues its rotation by the rotation of the shaft 2 and the result is that a slipping action takes place between the rollers 5 and 6 and a relative movement between the cam teeth on these rollers, so that the rollers 5 and 6 are forced to move axially away from each other.

Since the pressure roller 5 engages the upper flange of the bracket it can not move axially and therefore the guide roller 6 is pushed axially downwardly, and the lower shaft extension 6'' of the guide roller 6 pushes the cancel lever 12 downwardly against the action of the tension spring 13. Thus, the tip 14 on the cancel lever 12 is moved into the range of movement of the pin 3 on the flywheel 1.

Since the flywheel 1 is still rotating together with the shaft 2, the tip 14 is engaged by the pin 3, so that the latter pushes the tip 14 in the direction of the arrow shown in FIG. 1, and this results in a lengthwise movement of the cancel lever 12 toward the right.

This movement is transferred by the coupling rod 11 to the locking bar 9 which moves in the direction of the arrow, so that, the starting button 10 is released and returns under the action of a spring 15, in the direction of the arrow shown in FIG. 1 to its starting position.

As a result, all mechanical mechanisms of the reproducing or recording device are stopped and the power switch is opened, and all action on the magnetic tape reproducer or recorder is discontinued.

The present invention is particularly useful in magnetic tape reproducers and recorder which employ a magnetic tape in so-called "CASSETTE." However, the invention can easily be used in connection with other types of magnetic tape reproducers or recorders such as the reel-to-reel devices or the open-reel devices in which one end of the magnetic tape is fixed to the tape reel.

What I claim is:

1. An automatic switch-off system for a magnetic tape reproducer or recorder having a manually operable starting button adjusted to be locked in the running position of the reproducer or recorder, said switch-off system comprising a pressure roller and an axially displaceable guide roller mounted for independent rotation in spaced axial relation on a common shaft, a motor-driven shaft for driving said two rollers in the locked position of said starting button, whereby the magnetic tape is urged by said pressure roller against said shaft, means for causing said rotating guide roller to be axially displaced when, after the run-off of said tape the end portion of the same is stopped and arrests the rotation of said pressure roller, and means actuated by said axially displaced guide roller to unlock said starting button so that the same returns to its starting position in which the reproducer or recorder is switched off.

2. An automatic switch-off system according to claim 1, including a flywheel attached to said shaft, pin means on said flywheel, a locking bar for said starting button, a cancel lever operatively connected with one of its ends to said locking bar and disposed with its other end adjacent said axially displaceable guide roller to be moved into the path of said pin means on said flywheel when said guide roller is axially displaced, said pin means actuating said cancel lever and the latter actuating said locking bar to release said starting button.

3. An automatic switch-off system according to claim 1, in which said two rollers are provided on their ends facing each other with intermeshing saw-tooth-like cams arranged in such a manner that upon arresting of said pressure roller the camming action between said intermeshing saw teeth causes the guide roller to move axially away from said pressure roller during the continuous rotation of said guide roller.

4. An automatic switch-off system according to claim 1, including a pivotally mounted bracket which is U-shaped in cross section and has two spaced parallel flanges, one end of said bracket having mounted between said two flanges, a shaft on which said two rollers are mounted independently rotatable with respect to each other.

* * * * *